March 23, 1926. 1,578,163
A. A. MUEHLEIB
WORK CENTERING DEVICE
Filed March 22, 1924   3 Sheets-Sheet 1
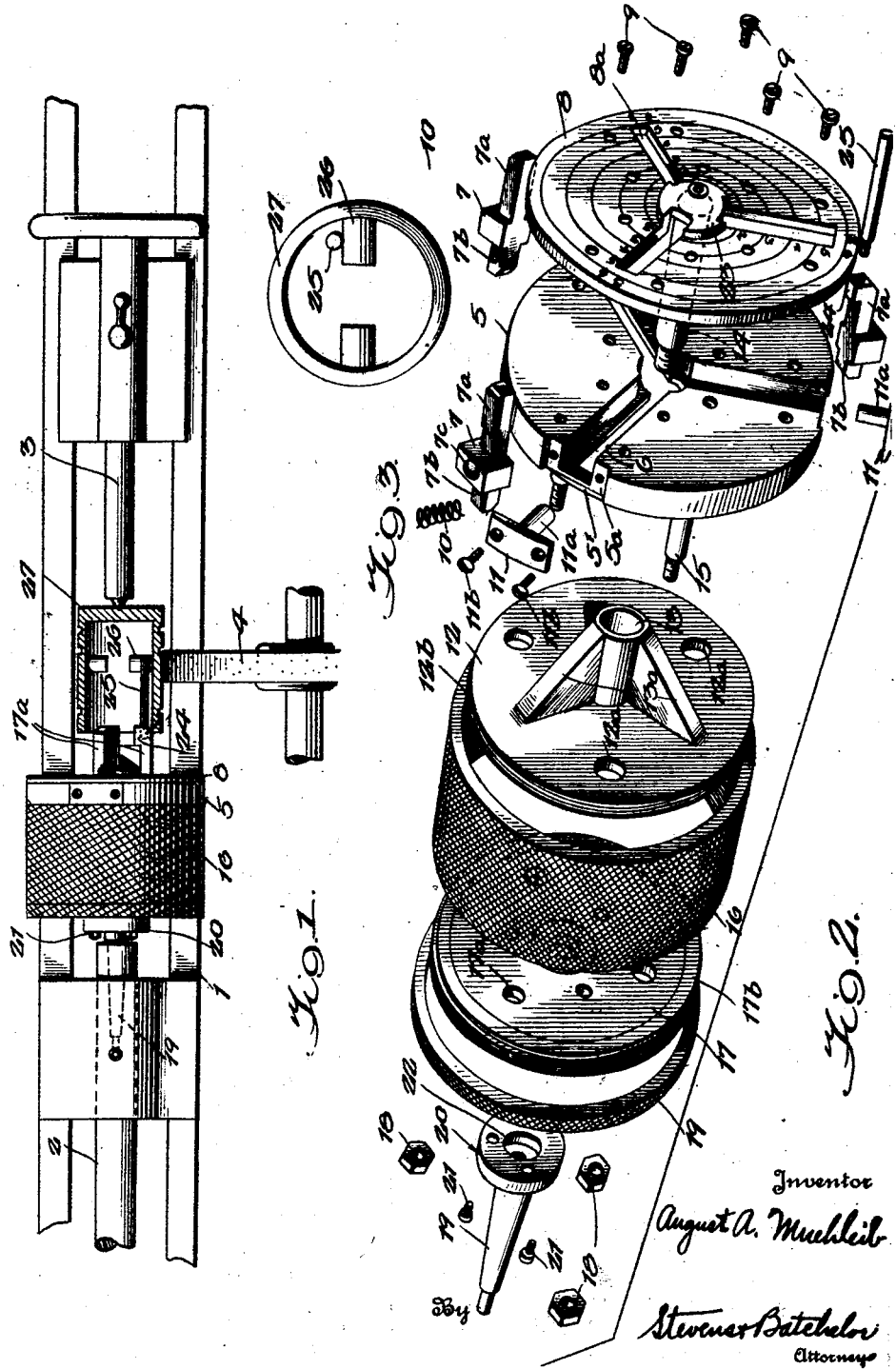

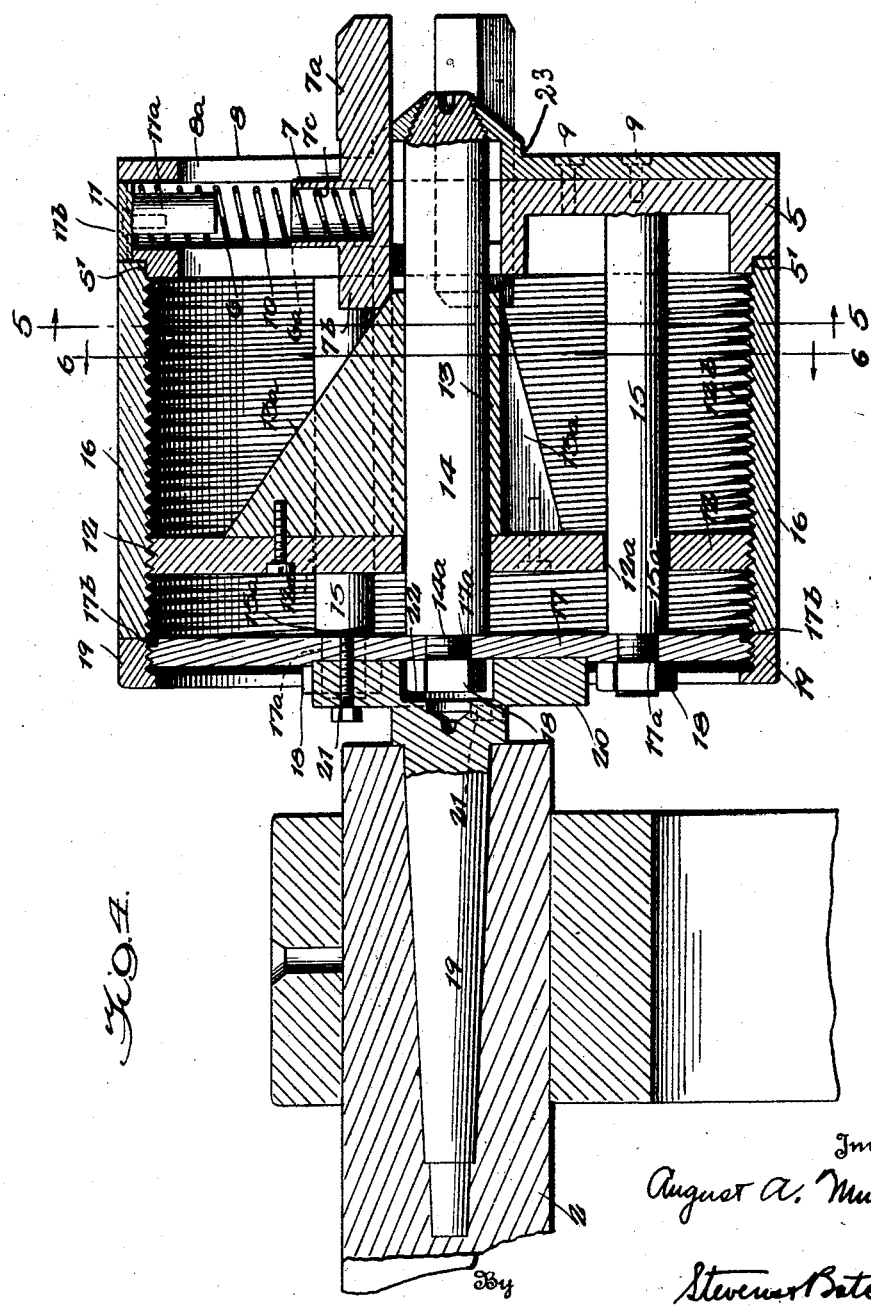

March 23, 1926. 1,578,163
A. A. MUEHLEIB
WORK CENTERING DEVICE
Filed March 22, 1924 3 Sheets-Sheet 3

Inventor
August A. Muehleib
By Stevens Batchelor
Attorneys

Patented Mar. 23, 1926.

1,578,163

UNITED STATES PATENT OFFICE.

AUGUST A. MUEHLEIB, OF ALLENTOWN, PENNSYLVANIA.

WORK-CENTERING DEVICE.

Application filed March 22, 1924. Serial No. 701,078.

*To all whom it may concern:*

Be it known that I, AUGUST A. MUEHLEIB, a citizen of the United States, residing at Allentown, in the county of Lehigh and State of Pennsylvania, have invented certain new and useful Improvements in Work-Centering Devices, of which the following is a specification.

The tool forming the subject matter of the present application for patent has been designed primarily for use in connection with abrading machines for properly centering the work, and is especially adapted for use in the operation of reducing the diametric dimensions of automobile pistons so that the same will properly fit the cylinder bores.

Briefly stated, an important object of the invention is the provision of a tool of this character which is susceptible of adaptation for use in connection with lathes, and, in short, the majority of abrading machines which include detachable work holders, the invention contemplating especially means which will permit the work to properly center itself.

Another object of the invention is to furnish a centering tool including adjustable means for adapting the same to be used in connection with work of varying sizes, a novel and improved means being employed for securing a desired adjustment of the work-engaging members, and a locking means being provided for maintaining these members in an adjusted position.

The invention further aims to present a centering tool as characterized for use in connection with rotating chucks of various types of lathes which includes a work rotating element in association with the work-centering devices.

A still further object of the invention is the provision of a centering tool which will be relatively inexpensive of manufacture, readily assembled and taken apart, and highly efficient in practical use.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described what I now regard as the preferred embodiment of my invention.

In the drawings,

Figure 1 is a top plan view, partly in section, illustrating the application of my tool to a grinding machine and showing a piston centered thereby to be operated upon by a grinding element;

Fig. 2 is a group perspective view of the various parts disassembled;

Fig. 3 is a cross-section on the line 3—3 of Fig. 1;

Fig. 4 is a central vertical sectional view through the tool and a portion of a grinding machine;

Figure 6:
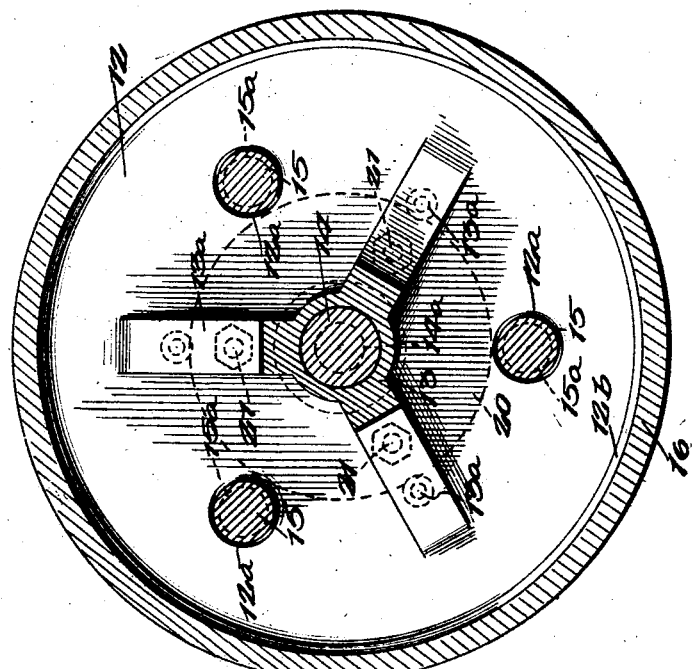
Fig. 6 is a similar view on the line 6—6 of Fig. 4, looking in the direction of the arrows.
Figure 5:
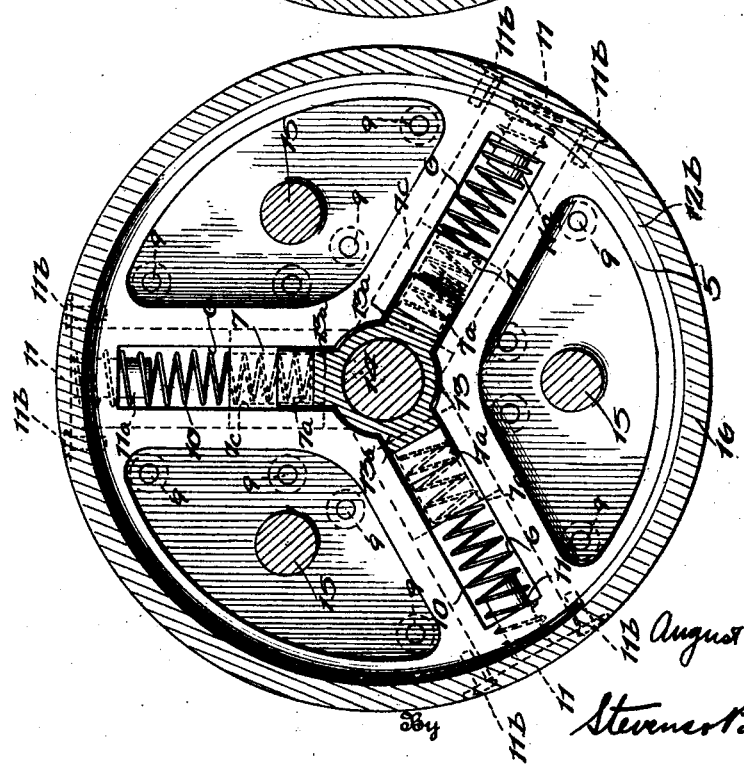
Fig. 5 is a section on the line 5—5 of Fig. 4.

Referring specifically to the drawings, wherein like reference characters have been used to designate like parts throughout all views, numeral 1 indicates generally a grinding machine of the type having a driven chuck shaft 2, a tail stock 3 and an abrading wheel 4 which latter is adapted to be moved back and forth throughout the length of the work during the operation of the machine in a well known manner. Since the grinding machine, per se, is of well known construction and no novelty is claimed therefor, further description or illustration of the same is deemed superfluous.

As best shown in Figs. 2 and 4, the tool comprises a circular base 5 having a plurality of radial slots or slideways 6 cut therein and intersecting each other at the center of the base. These slots 6 extend transversely through the base and shoulders $6^a$ are provided to support slidable blocks or slide members 7, the latter having diametrically opposite arms $7^a$ and $7^b$, as clearly shown in Fig. 2. The arms or jaws $7^a$ are adapted to be projected through slots $8^a$ in a forward cover plate 8 fastened to the forward end of the base member 5 by means of screws 9, it being here noted that the slots $8^a$ are of such width as to prevent removal of the slide members 7 therethrough. Each slide member 7 is provided with a recess $7^c$ in its outer face for the reception of one end of a coil spring 10, the other end of which is adapted to encircle a stud $11^a$ projecting from the inner face of a plate 11 which latter is adapted to close the outer ends of the slots 6 and is secured in a recess in the periphery of the base member 5 by means of screws 11$^b$. Thus the springs 10 normally tend to urge the slide members in the direction of the inner ends of the slots 6 and it should here be noted that since the plates 11 are removable the springs may be readily replaced as occasion may require.

As a means for moving the slide members 7 radially outward in their slots I have illustrated an annular disk-like plate 12 of somewhat smaller diametric dimension than the base 5, which plate is provided upon its forward face with a concentric sleeve 13 carrying a plurality of outwardly beveled radial wings 13$^a$, the beveled surfaces of which upon movement of the plate in the direction of the base 5 are adapted to be received in the slots 6 thereof and engage the beveled portions of the arms 7$^b$ causing the slide members to recede in their slots. Rising from the cover plate 8 through the base 5 is a central post 14 which extends slidably through the sleeves 13. Posts 15 rising from the base 5 and passing through apertures 12$^a$ in the plate 12 serve to guide the same and prevent rotation thereof.

Movement of the plate 12 toward and away from the base 5 is controlled by means of a sleeve 16 which is internally threaded to match the peripheral threads 12$^b$ of the plate 12. This sleeve 16 is supported by a circumferential shoulder 5' formed around the upper periphery of the base member 5 and upon which shoulder said sleeve is adapted to freely rotate, the outer portion of this sleeve being preferably knurled to present a roughened surface to facilitate rotation. Obviously, since the sleeve is incapable of movement toward the base, rotation thereof in a proper direction will cause the plate 12 to move in the direction of the base 5.

The base 5, plate 12 and collar 16 are held in assembled relation by means of a rear cover plate 17 which is adapted to be supported upon the shoulders 14$^a$ and 15$^a$ of the respective posts 14 and 15, each of which is provided with a reduced threaded extension adapted to be projected through apertures 17$^a$ provided in said rear cover plate to receive suitable nuts 18. As best shown in Fig. 4, the rear cover plate 17 has a relatively smaller diameter than the base member 5 and is circumferentially screw threaded to receive a clamping ring 19 which is adapted to be tightened against the collar 16 to rigidly clamp the same against its supporting shoulder and prevent movement thereof thus assuring the maintenance of the slide members 7 in the desired adjusted position.

The rear cover plate 17 has a circumferential edge reduction 17$^b$ forming a shoulder which will be slightly spaced from the adjacent periphery of the collar 16 and which will be adapted to support said collar in the event that the tool is used in inverted position.

The tool will be attached in the chuck of the shaft 2 by means of a tapered spindle 19 having a flanged portion 20 suitably apertured to receive screws 21 which are adapted to thread into the rear cover plate 17. A central recess 22 is provided in the flanged base of the spindle 19 for the reception of the nut 18 which is upon the central post 14, it being here observed that this post 14 serves to effectually bind the forward bottom cover plate 8 in position, co-operating also with the post 14 for providing a very rigid and satisfactory assembled structure.

The forward bottom cover plate 8 as will be noted from an inspection of Figs. 2 and 4 is provided with a medial projection 23 to provide a countersunk recess in the upper face of said bottom cover plate 8 for the reception of the end of the sleeve 13 when the plate 12 has been moved to conduct the slide members 7 to the limit of their outward travel in the slots 6. It might also be stated that the central post 14 is preferably screwed into said medial projection 23 as clearly shown in Fig. 2, a centering recess being provided in the end of said post as shown.

The arm 7$^a$ of one of the slide members is provided with an offset portion 24 which latter has a tapped transverse aperture to receive the threaded end of a pin 25 which arm is adapted to co-operate with the wrist pin receiving sleeve 26 of a piston 27 to rotate the same with the tool as will be readily understood from a glance at Figs. 1 and 3. It will be appreciated that the spindle 19 may be replaced with any form of spindle as may be required to suit the particular machine with which the tool is to be used.

The operation may be summarized as follows:

The tool having been attached to the shaft 2 the collar 16 will be rotated to bring the slide members radially outward a sufficient distance so that the piston or other work to be operated upon will be supported by the beveled outer portions $b$ of the ends of the arms 7$^a$ when the piston is moved thereagainst by means of the tail stock 3. It will be evident that the beveled portions $b$, when the piston is moved thereagainst, will automatically permit the same to center itself and be effectually held in such position during the grinding operation. The tool will preferably be rotated in the opposite direction from that in which the grinding wheel 4 is rotated, the piston or other work being rotated with the tool by means of the arm 25 as heretofore explained, it being remembered that the binding wheel 4 is of the type which moves back and forth longitudinally of the work while it is in motion.

In accordance with the patent statutes the preferred embodiment of the invention has been described and illustrated herein, but since various changes and modifications of the same will readily occur to those skilled in the art, I specifically reserve the right to make such departures from the illustrated form of the invention as fairly fall within the spirit and scope of the following claims.

What I claim as new and desire to secure by Letters Patent is:

1. A tool of the class described including a base member having a medial opening and radial slideways communicating with said opening, work-engaging jaws slidably mounted in said slideways and having beveled work supporting surfaces at their forward ends whereby the work can center itself thereon, means for yieldably urging said work engaging jaws toward said medial opening, a member, carried by a plate within the circumferential opening of a sleeve, having cammed surfaces cooperating with the rear portion of said work engaging jaws for moving the same from said medial opening, a sleeve carried by said base member for moving said plate toward and from said work engaging jaws, and means for locking said work engaging jaws in a predetermined position.

2. A tool of the class described, including a base member having a medial opening and radial slideways communicating with said opening, work-engaging jaws slidably mounted in said slideways and having beveled work supporting surfaces at their forward ends whereby the work can center itself thereon, means for yieldably urging said work engaging jaws toward said medial opening, a member, carried by a plate within the circumferential opening of a sleeve, having cammed surfaces cooperating with the rear portion of said work engaging jaws for moving the same from said medial opening, a sleeve carried by said base member for moving said cam member toward and from said work engaging jaws, and means cooperating with said cam member for locking said work engaging jaws in a predetermined position.

3. A tool of the class described, including a base member having a medial opening and radial slideways communicating with said opening, work-engaging jaws slidably mounted in said slideways and having beveled work supporting surfaces at their forward ends whereby the work can center itself thereon, means for yieldably urging said work engaging jaws toward said medial opening, a member carried by a plate and having cammed surfaces cooperating with the rear portion of said work engaging jaws for moving the same from said medial opening, means carried by said base member for moving said plate towards and from said work engaging jaws, and means for locking said work engaging jaws in a predetermined position, comprising posts extending through said plate adapted to prevent the rotation thereof, the rear ends of which have a reduced screwthreaded portion extending through a locking plate and secured against withdrawal by a nut.

4. A tool of the class described, including a base member having a medial opening and radial slide-ways communicating with said opening, slide members mounted in said slideways, work engaging jaws carried by said slide members and having beveled work supporting surfaces whereby the work can center itself thereon, means for yieldably urging said slide members toward said opening, a member slidably connected to said base member and having cammed surfaces cooperating with the rear portion of said work engaging jaws for moving the same from said opening, means carried by said base member for moving said member toward and from said slide members, and means for locking said work engaging jaws in a predetermined position.

5. A tool of the class described, including a base member having a medial opening and radial slideways communicating with said opening, slide members mounted in said slideways, work engaging jaws carried by said slide members and having beveled work supporting surfaces whereby the work can center itself thereon, means for yieldably urging said slide members toward said opening, a member, slidably connected to said base member and within the circumferential opening of the body member, having cammed surfaces co-operating with the rear portion of said work engaging jaws for moving the same from said opening, means carried by said base member for moving said cam member toward and from said work engaging jaws, and means co-operating with said cam member actuating means for locking the same and said work engaging jaws in a predetermined position.

6. A tool of the class described, including a base member having a medial opening therein, radial slideways communicating with said medial opening, slide members carried in said slideways and yieldably held in proximity to said opening, work engaging jaws carried by said slide members, a cover plate carried by said base member for retaining said slide members in said slideways, said cover plate having radial slots through which said jaws project, a cam member movable toward and from said base member, said cam member co-operating with the rear portion of said work engaging jaws for causing the same to simultaneously recede from said medial opening, guiding means for said cam member, means for controlling the movement of said cam member toward and from said base member, and means co-operating with said last-mentioned means for maintaining said work engaging jaws in a predetermined position.

7. A tool of the class described, including a base member having a medial opening therein and radial slideways communicating with said medial opening, slide members carried in said slideways, springs removably positioned in said slideways for urging said slide members toward said medial opening, work engaging jaws carried by said slide members and projecting from said slideways, said jaws having work contacting surfaces adapted to permit the work to center itself thereon, means carried by said base member for retaining said slide members within said slideways, a member having cammed surfaces movable toward and from said base member for simultaneously moving said work engaging jaws from said opening, guiding means for said last-mentioned member, and a rotatable collar supported by said base member and having an operative connection with the plate carrying said cam member for moving the same toward and from said base member.

8. A tool of the class described, including a base member having a medial opening therein and radial slideways communicating with said opening, slide members carried in said slideways, springs removably positioned in said slideways for urging said slide members toward said medial opening, work engaging jaws carried by said slide members and projecting from said slideways, said jaws having work contacting surfaces adapted to permit the work to center itself thereon, means carried by said base member for retaining said slide members within said slideways, a plate member having cammed surfaces movable toward and from said base member for simultaneously moving said work engaging jaws from said opening, guiding means for said last-mentioned member, a rotatable collar supported by said base member and having an operative connection with the plate member carrying said cam member for moving the same toward and from said base member, retaining means for said collar, and clamping means carried by said retaining means for locking said collar against movement and maintaining said work engaging jaws in a predetermined position.

9. A tool of the class described, including means for attachment to a chuck, a body portion, radially movable members carried by said body portion and having projecting work supporting surfaces, means associated with said radially movable members co-operable with the work for rotating the same with said body portion, actuating means for said radially movable members, and locking means operating upon said last-mentioned means for preventing movement of the same and said radially movable members.

10. The combination with a machine, including a rotatable chuck and an axially alined tail stock; of a work centering attachment having means for attachment to said chuck, said device including a body portion, radially adjustable work supporting members extending from said body portion in the direction of said tail stock, said members having beveled work contacting surfaces whereby the work will be permitted to center itself when moved against said surfaces by said tail stock, means for controlling the movement of said work supporting members, and an extension carried by one of said adjustable members co-operable with said work for rotating the same with said centering device and chuck.

11. A work centering attachment for chucks, including a body portion having a medial opening therein, radial slots communicating with said opening, slide members carried in said slots and having projecting work supporting portions, a cover plate for said body portion for retaining said slide members in said slots, said cover plate having radial slots through which said work supporting portions project, cam controlled means for causing said slide members to recede in said slots, said means including an axially movable disk-like plate having beveled radial wings projecting from one face thereof adapted to enter said slots and engage the rear portion of said work engaging jaws, guide posts for said plate rising from said body portion, a rotatable collar supported upon said body portion and having an operative connection with said disk-like plate whereby the same may be moved toward and from said work engaging jaws, a rear cover plate supported by the ends of said guide posts for holding said collar in position, and locking means carried by said rear cover plate co-operating with said collar for locking the same against movement.

In testimony whereof I affix my signature.

AUGUST A. MUEHLEIB.